United States Patent
Shtrom et al.

(10) Patent No.: US 10,015,667 B2
(45) Date of Patent: Jul. 3, 2018

(54) INHIBITING LOCATION TRACKING USING PROBE-REQUEST ADDRESSES

(71) Applicant: Ruckus Wireless, Inc., Sunnyvale, CA (US)

(72) Inventors: Victor Shtrom, Los Altos, CA (US); William S Kish, Saratoga, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 24 days.

(21) Appl. No.: 15/403,117

(22) PCT Filed: Jul. 18, 2014

(86) PCT No.: PCT/US2014/047317
§ 371 (c)(1),
(2) Date: Jan. 10, 2017

(87) PCT Pub. No.: WO2016/010564
PCT Pub. Date: Jan. 21, 2016

(65) Prior Publication Data
US 2017/0188228 A1   Jun. 29, 2017

(51) Int. Cl.
*H04W 8/26* (2009.01)
*H04W 4/02* (2018.01)
*H04W 88/02* (2009.01)

(52) U.S. Cl.
CPC ............... *H04W 8/26* (2013.01); *H04W 4/02* (2013.01); *H04W 88/02* (2013.01)

(58) Field of Classification Search
CPC ............. H04L 61/1511; H04L 61/2015; H04L 29/06027; H04L 29/12066; H04L 29/12283; H04L 29/1282; H04L 61/2061; H04L 61/2076; H04L 61/6013; H04W 76/02; H04W 8/26; H04W 48/08
See application file for complete search history.

(56) References Cited

U.S. PATENT DOCUMENTS

| | | | |
|---|---|---|---|
| 2002/0044661 A1 | 4/2002 | Jakobsson | 380/270 |
| 2005/0050352 A1* | 3/2005 | Narayanaswami | H04L 63/08 726/4 |
| 2006/0165100 A1 | 7/2006 | Huang | 370/400 |

(Continued)

OTHER PUBLICATIONS

International Search Report and Written Opinion for PCT/US2014/047317, dated Mar. 23, 2015.

*Primary Examiner* — Charles Appiah
*Assistant Examiner* — Edward Zhang
(74) *Attorney, Agent, or Firm* — Stewart M. Wiener; Steven E. Stupp

(57) ABSTRACT

Passive tracking of an electronic device (and, more generally, the anonymous use of location-based services) is avoided by identifying the electronic device with different addresses in a block of addresses when transmitting probe requests. In particular, the electronic device may request and then receive the block of addresses from an address-management server. Subsequently, when a probe request is transmitted (e.g., to an access point), the electronic device may use one of the addresses in the block of addresses instead of the media access control (MAC) address. Furthermore, whenever subsequent probe requests are transmitted, the electronic device may include a different address in the block of addresses.

20 Claims, 6 Drawing Sheets

(56) References Cited

U.S. PATENT DOCUMENTS

| | | | |
|---|---|---|---|
| 2007/0171871 A1 | 7/2007 | Forsberg ....................... | 370/331 |
| 2007/0217364 A1* | 9/2007 | Kawakami .......... | H04L 12/4679 |
| | | | 370/331 |
| 2009/0325615 A1 | 12/2009 | McKay ........................ | 455/466 |
| 2010/0189029 A1* | 7/2010 | Jing .................... | H04L 29/1232 |
| | | | 370/328 |
| 2010/0189082 A1 | 7/2010 | Choi ............................ | 370/336 |
| 2012/0166657 A1* | 6/2012 | Toumura ............ | H04L 67/1038 |
| | | | 709/228 |

\* cited by examiner

INHIBITING LOCATION TRACKING USING PROBE-REQUEST ADDRESSES

This application claims priority under 35 U.S.C. § 371 to International Application No. PCT/US2014/047317, "Inhibiting Location Tracking Using Probe-Request Addresses," by Victor Shtrom, et al., filed on Jul. 18, 2014, the contents of which are herein incorporated by reference.

BACKGROUND

Field

The described embodiments relate to techniques for communicating information in a wireless network. In particular, the described embodiments relate to techniques for inhibiting passive location tracking of an electronic device by using addresses other than a media access control (MAC) address in probe requests.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth™ from the Bluetooth Special Interest Group of Kirkland, Wash.), and/or another type of wireless network.

During communication with the other electronic devices, the networking subsystem typically includes information that identifies a transmitting electronic device. For example, for communication using a communication protocol that is compatible with an IEEE 802.11 standard (such as IEEE 802.11a, IEEE 802.11b, IEEE 802.11g, IEEE 802.11n or IEEE 802.11ac), the transmitting electronic device may provide probe requests that include a media access control (MAC) address of the transmitting electronic device.

However, because the MAC address uniquely identifies the transmitting electronic device, this information can be used to track the location of the electronic device. In particular, a location-based service in a wireless network can use the transmitted MAC address to passively track the location of the transmitting electronic device. While this capability can facilitate a variety of services, it also raises privacy and security concerns, especially because a user of the transmitting electronic device may be unaware that their location is being tracked.

SUMMARY

The described embodiments include an electronic device that includes: a node that can couple to an antenna; and an interface circuit that communicates with an address-management server and one or more other electronic devices (such as access points). During operation, the interface circuit: requests, from the address-management server, a block of addresses that identifies the electronic device; and receives, from the address-management server, the block of addresses. Then, the interface circuit: transmits, to the other electronic device, a probe request; and receives, from the other electronic device, a probe reply in response to the probe request. The probe request includes an address in the block of addresses. Moreover, a subsequent probe request to another of the one or more other electronic devices includes a different address in the block of addresses than the address, and addresses in the block of addresses are other than a media access control (MAC) address of the electronic device.

By using the addresses in the block of addresses, the electronic device may inhibit passive location tracking of the electronic device.

Note that the addresses in the block of addresses may include a first portion that identifies a manufacturer of the electronic device and a second portion that identifies the electronic device. Moreover, the second portion of the addresses may include: pseudorandom numbers, random numbers; a set of sequential numbers; and hexadecimal coding.

Furthermore, after the electronic device associates with one of the one or more other electronic devices, the interface circuit may include the MAC address during communication with the one of the one or more other electronic devices.

Additionally, the interface circuit may communicate with the address-management server and the one or more other electronic devices using a communication protocol that is compatible with an IEEE 802.11 standard.

In some embodiments, the electronic device includes: a processor; and a memory that stores a program module that is executed by the processor. The program module may include instructions for providing a command for the block of addresses, and the interface circuit may request the block of addresses in response to the command.

Another embodiment provides a computer-program product for use with the electronic device. This computer-program product includes instructions for at least some of the operations performed by the electronic device.

Another embodiment provides a communication circuit. This communication circuit includes: a node that can couple to the antenna; and the interface circuit. This communication circuit may perform operations performed by the electronic device.

Another embodiment provides a method for identifying the electronic device using a block of addresses. This method includes at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Passive tracking of an electronic device (and, more generally, the anonymous use of location-based services) is avoided by identifying the electronic device with different addresses in a block of addresses when transmitting probe requests. In particular, the electronic device may request and then receive the block of addresses from an address-management server. Subsequently, when a probe request is transmitted (e.g., to an access point), the electronic device may use one of the addresses in the block of addresses instead of the media access control (MAC) address. Furthermore, whenever subsequent probe requests are transmitted, the electronic device may include a different address in the block of addresses. By transmitting probe requests with unique identifiers (the addresses in the block of addresses) that cannot be directly associated with the electronic device without the assistance of the address-management server, this communication technique may ensure that the location of the electronic device cannot be passively tracked using many existing location-based services (which often determine the transmit locations of the electronic device using triangulation or trilateration, and then uniquely associate the determined transmit locations with the MAC address). In this way, the communication technique may help protect the privacy of a user of the electronic device, and may enhance security.

In the discussion that follows transmitting and receiving electronic devices include radios that communicate packets in accordance with a communication protocol, such as an Institute of Electrical and Electronics Engineers (IEEE) 802.11 standard (which is sometimes referred to as 'Wi-Fi®,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols may be used.

Figure 1:
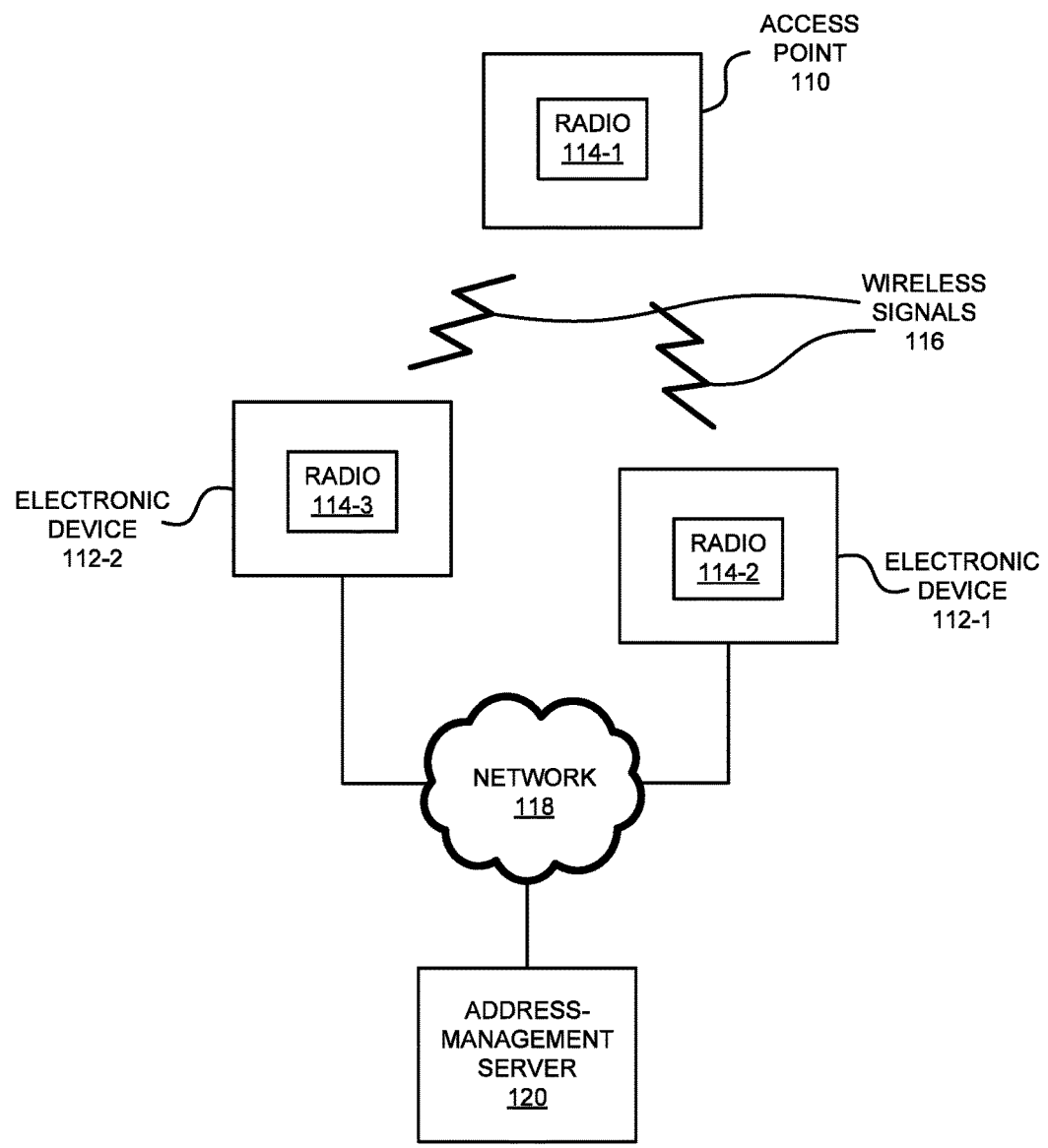
FIG. 1 is a block diagram illustrating electronic devices wirelessly communicating in accordance with embodiments of the present disclosure.

Communication among electronic devices is shown in FIG. 1, which presents a block diagram illustrating access point 110 and one or more electronic devices 112 (such as portable electronic devices, e.g., cellular telephones) wirelessly communicating according to some embodiments. In particular, these electronic devices may wirelessly communicate while: transmitting advertising frames on wireless channels, detecting one another by scanning wireless channels, establishing connections (e.g., by transmitting beacons, probe requests, probe replies, authentication messages, association requests, association replies, etc.), and/or transmitting and receiving packets (which may include feedback about the communication and/or additional information as payloads).

Figure 5:
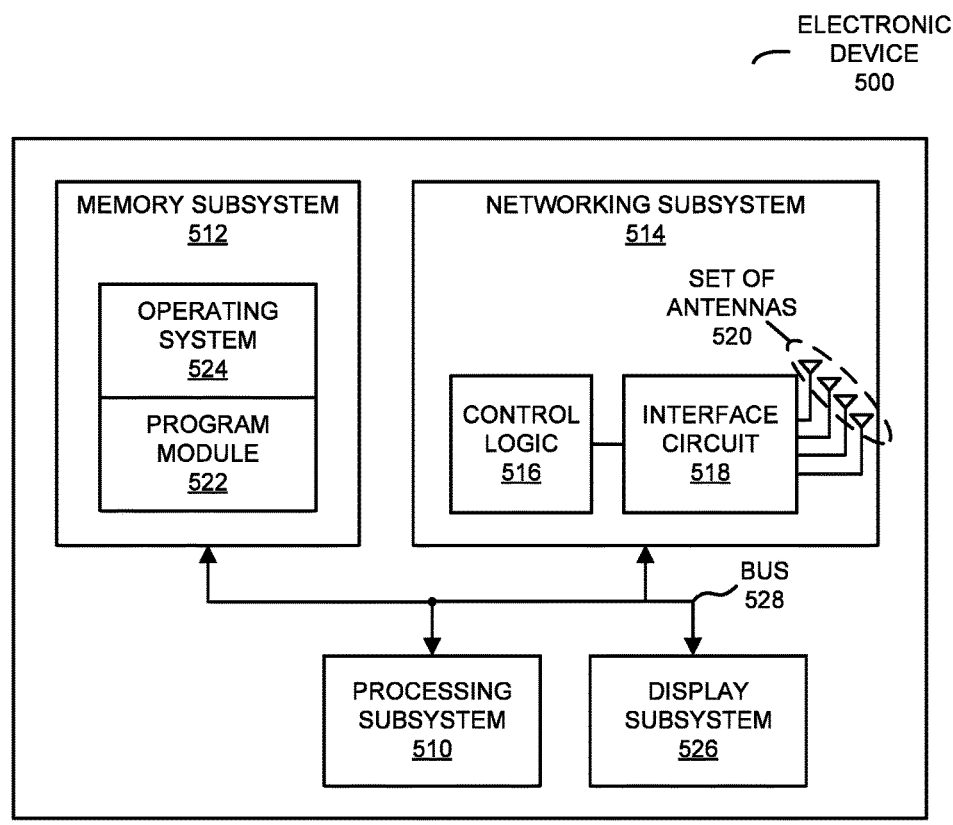
FIG. 5 is a block diagram illustrating one of the electronic devices of FIG. 1 in accordance with embodiments of the present disclosure.

As described further below with reference to FIG. 5, access point 110 and the one or more electronic devices 112 may include subsystems, such as a networking subsystem, a memory subsystem and a processor subsystem. In addition, access point 110 and the one or more electronic devices 112 may include radios 114 in the networking subsystems. More generally, access point 110 and the one or more electronic devices 112 can include (or can be included within) any electronic devices with the networking subsystems that enable access point 110 and the one or more electronic devices 112 to wirelessly communicate with each other. This wireless communication can comprise transmitting advertisements on wireless channels to enable electronic devices to make initial contact or detect each other, followed by exchanging subsequent data/management frames (such as probe requests, probe replies, association requests, association responses, etc.) to establish a connection, configure security options (e.g., Internet Protocol Security), transmit and receive packets or frames via the connection, etc.

As can be seen in FIG. 1, wireless signals 116 (represented by jagged lines) are transmitted from a radio 114-1 in access point 110. These wireless signals 116 are received by radios 114 in the one or more electronic devices 112. In particular, access point 110 may transmit packets. In turn, these packets may be received by at least the one of electronic devices 112. This may allow access point 110 to communicate information to electronic devices 112.

For example, electronic device 112-1 may transmit a probe-request frame. After receiving the probe-request frame, access point 110 may transmit a probe-reply frame. In existing communication techniques, the probe-reply frame typically includes the MAC address of electronic device 112-1. However, this can allow access point 110 to passively track the location of electronic device 112-1 (such as by triangulation and/or trilateration, and leveraging the MAC address as a unique or universal identifier of electronic device 112-1).

Instead, in the disclosed embodiments of the communication technique, electronic device 112-1 may request a block of addresses, via network 118, from address-management server 120 that identifies electronic device 112-1. (Note that communication via network 118 may involve wired and/or wireless communication.) In response, address-management server 120 may, via network 118, provide a unique block of address to electronic device 112-1. Then, when electronic device 112-1 transmits a probe-request frame to access point 110, electronic device 112-1 may use one of the addresses in the block of addresses (instead of the MAC address assigned at the time of manufacturing). Moreover, as described further below with reference to FIG. 4, subsequent probe-request frames from electronic device 112-1 (transmitted to access point 110 or another electronic device) may include a different one of the addresses in the block of addresses until all the addresses have been used once, at which point the sequential use of the addresses may repeat or a different block of addresses may be requested from address-management server 120 (alternatively, the addresses in the block of addresses may be used randomly). Note that, after electronic devices 110 and 112-1 are associated, electronic device 112-1 may include its MAC address in one or more frames or messages transmitted to access point 110, so that data can be communicated between electronic devices 110 and 112-1.

By using the addresses in the block of addresses, electronic device 112-1 may inhibit passive location tracking of electronic device 112-1 (e.g., by access point 110). This capability may be offered to customers a way to defeat location-mapping or location-tracking attempts.

Alternatively or additionally, electronic device 112-1 may use other techniques to make location tracking difficult (and, in particular, to confuse probabilistic localization techniques). For example, an interface circuit in electronic device 112-1 may modify the per-packet transmit power levels by reducing the transmit power by a random amount or percentage (such as by up to 10 dB), where the random amount may be selected from a configurable distribution that is changed over time. Consequently, the received signal strength indicator (RSSI) may vary randomly over time, which may complicate or defeat attempts to determine the location of electronic device 112-1 using triangulation. The same effect may be achieved in multi-antenna systems or beamforming systems by randomizing the transmit beamforming phase coefficients (such as by up to 3 dB), where the phase randomization may be selected from a configurable distribution that is changed over time. In particular, the variation in the antenna pattern may result in a variation in the RSSI, which may make it seem as if electronic device 112-1 is nearer or further away. Moreover, a time-varying RSSI may be obtained by modulating the transmit-physical-layer data rates so that different transmit power levels occur. In addition, the acknowledgment turn-around time may be modified using a random delay, where the random delay is selected from a configurable distribution that is changed over time. Based on the arrival time, this may make it seem as if electronic device 112-1 is further away, which may complicate or defeat attempts to determine the location of electronic device 112-1 using trilateration.

While the preceding examples used random offsets, in other embodiments an explicitly specified offset or a configurable sequence of offsets is used. Thus, antenna patterns selected from a predefined set of antenna patterns may be used at random so that the RSSI varies with time, etc.

In the described embodiments, processing a packet or frame in access point 110 and/or electronic devices 112 includes: receiving wireless signals 116 with the packet or frame; decoding/extracting the packet or frame from received wireless signals 116 to acquire the packet or frame; and processing the packet or frame to determine information contained in the packet or frame (such as the feedback, etc.).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
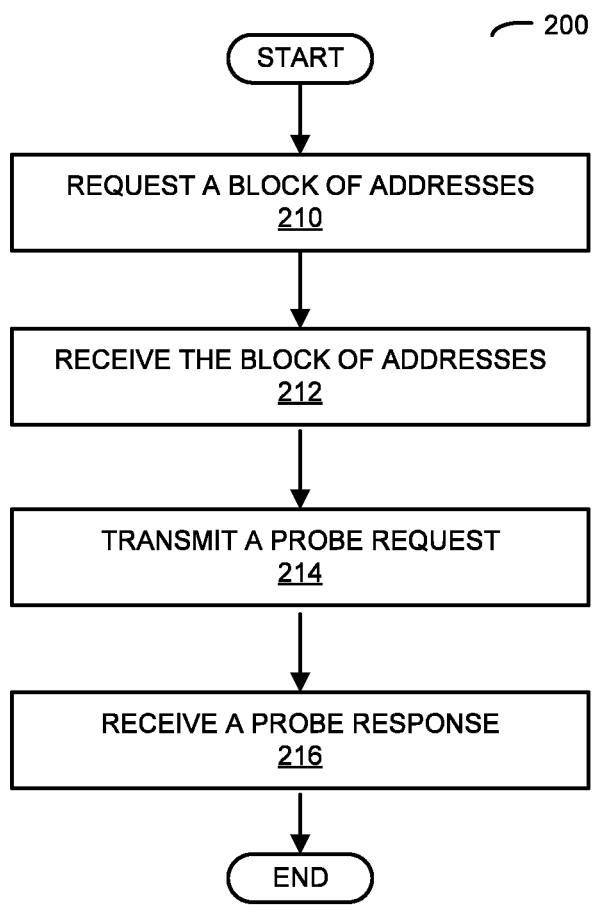
FIG. 2 is a flow diagram illustrating a method for identifying one of the electronic devices in FIG. 1 using a block of addresses during communication among the electronic devices in FIG. 1 in accordance with embodiments of the present disclosure.

FIG. 2 presents a flow diagram illustrating method 200 for identifying an electronic device (such as electronic device 112-1) using a block of addresses during communication among electronic devices 110 and 112 (FIG. 1) according to some embodiments. During operation, the electronic device requests, from an address-management server, a block of addresses (operation 210) that identifies the electronic device. Then, the electronic device receives, from the address-management server, the block of addresses (operation 212). Moreover, the electronic device transmits, to another electronic device, a probe request (operation 214), and the electronic device receives, from the other electronic device, a probe reply (operation 216) in response to the probe request. The probe request includes an address in the block of addresses and addresses in the block of addresses are other than a MAC address of the electronic device. Furthermore, a subsequent probe request to an additional electronic device includes a different address in the block of addresses than the address.

Figure 3:
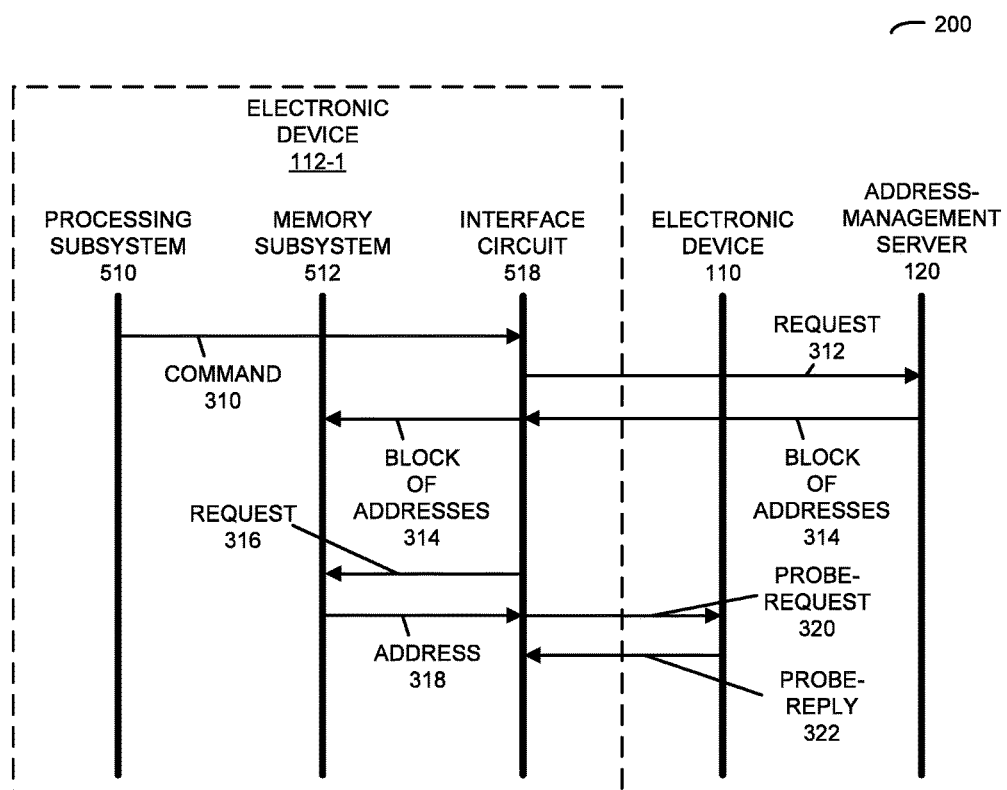
FIG. 3 is a flow diagram illustrating a method for communicating between an electronic device and another electronic device in FIG. 1 in accordance with embodiments of the present disclosure.

Embodiments of the communication technique are further illustrated in FIG. 3, which presents a drawing illustrating communication between the electronic device (such as electronic device 112-1 in FIG. 1) and the other electronic device (such as electronic device 110 in FIG. 1) during method 200. In particular, interface circuit 518 in electronic device 112-1 may request 312 a block of addresses from address-management server 120. In response, address-management server 120 may provide a unique block of addresses 314 to interface circuit 518. Moreover, interface circuit 518 may optionally store block of addresses 314 in memory subsystem 512.

Then, when interface circuit 518 transmits a probe-request frame 320 to access point 110, interface circuit 518 may use one of the addresses in the block of addresses (instead of the MAC address). Thus, interface circuit 518 may first optionally request 316 and then optionally receive an address 318 in the block of addresses from memory subsystem 512 for use in the probe-request frame. Next, electronic device 110 may transmit a probe-reply frame 322 to interface circuit 518. As noted previously, subsequent probe-request frames from interface circuit 518 (transmitted to access point 110 or another electronic device) may include a different one of the addresses in the block of addresses until all the addresses have been used at least once.

In these ways, the electronic device may facilitate privacy and security by defeating attempts to determine the location of the electronic device.

In some embodiments of method 200 in FIGS. 2 and 3, there may be additional or fewer operations. For example, processing subsystem 510 may provide a command 310 for the block of addresses, and interface circuit 518 may request 312 the block of addresses in response to the command. Additionally, the order of the operations in method 200 in FIGS. 2 and 3 may be changed, and/or two or more operations may be combined into a single operation.

Figure 4:
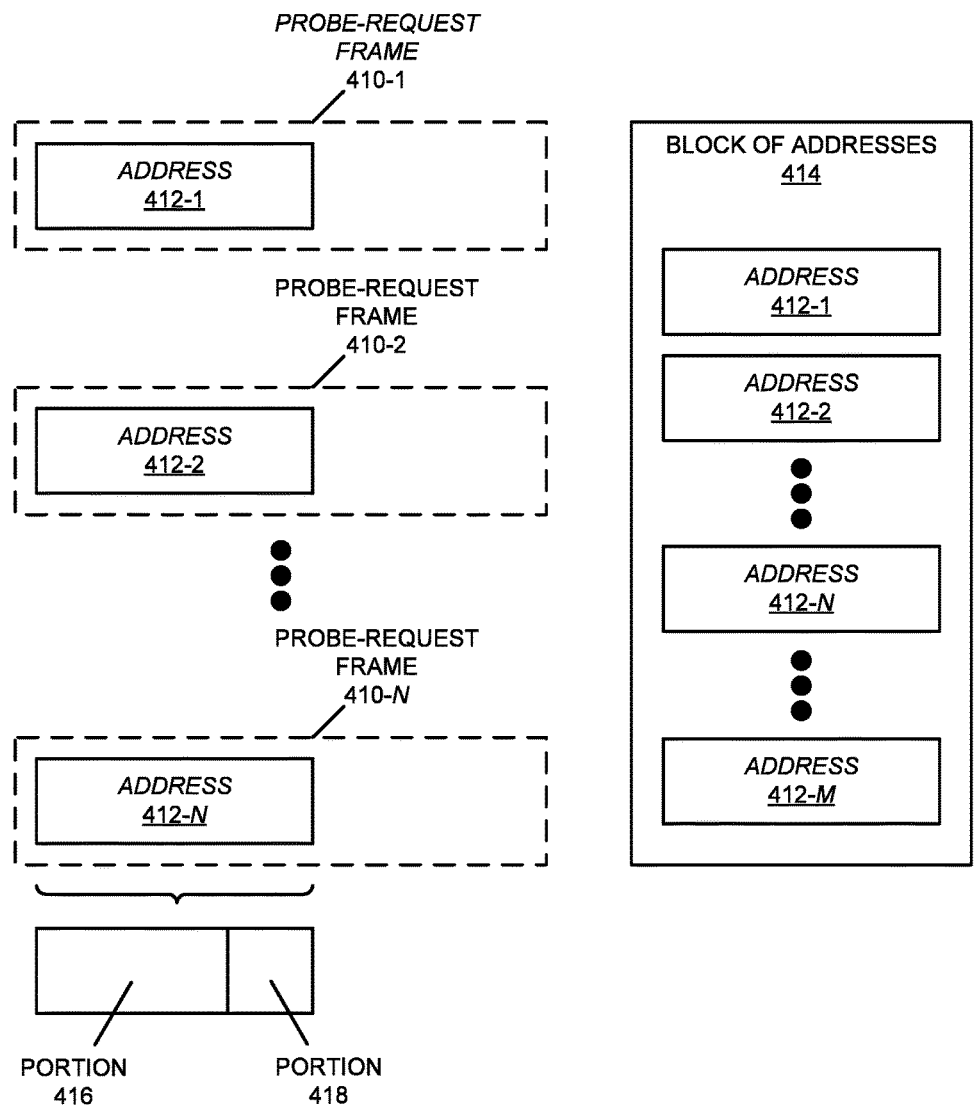
FIG. 4 is a drawing illustrating probe-request frames during communication among the electronic devices in FIG. 1 in accordance with embodiments of the present disclosure.

An exemplary embodiment illustrating probe-request frames 410 with different addresses 412 selected from a block of addresses 414 is shown in FIG. 4. In this example, the address in a given probe-request frame is used only once, but in other embodiments addresses 412 may be selected at random from block of addresses 414 or may be used multiple times in a sequential manner.

Note that each of addresses 412 in block of addresses 414 may include a fixed portion 416 that identifies a manufacturer of the electronic device and a variable portion 418 that identifies the electronic device. For example, portion 418 in different addresses 412 may include: pseudorandom numbers; random numbers; and/or a set of sequential numbers. The pseudorandom numbers, the random numbers and/or the set of sequential numbers may include hexadecimal coding. In an exemplary embodiment, a given address includes 12 bits. Portion 416 may include eight fixed bits that specify a manufacturer of the electronic device. The remaining four bits may be portion 418. These four bits may include random bits and/or selected bits. Thus, there may be two random bits and two bits selected from a sequence of bits. In this way, block of addresses 414 may include a set of addresses the uniquely identifies the electronic device while protecting the true or real MAC address of the electronic device.

We now describe embodiments of the electronic device. FIG. 5 presents a block diagram illustrating an electronic device 500, such as access point 110 or electronic device 112-1 in FIG. 1. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and a set of antennas 520. (While FIG. 5 includes set of antennas 520, in some embodiments electronic device 500 includes a set of nodes that can be coupled to set of antennas 520. Thus, electronic device 500 may or may not include set of antennas 520.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that in some embodiments set of antennas 520 includes multiple antenna elements in an adaptive array that can be selectively turned on and/or off by control logic 516 to create a variety of antenna patterns.

Networking subsystem 514 includes processors, controllers, radios or radio circuits (which communicate information using electromagnetic waves in the radio and/or microwave portions of the electromagnetic spectrum), power amplifier, antennas, sockets, plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device, a portable computing device, an access point, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems, memory subsystems, networking subsystems, and/or display subsystems. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments some or all of a given subsystem or component can be integrated into one or more of the other subsystems or component(s) in electronic device 500. For example, in some embodiments program module 522 is included in operating system 524 and/or control logic 516 is included in interface circuit 518.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

Figure 6:
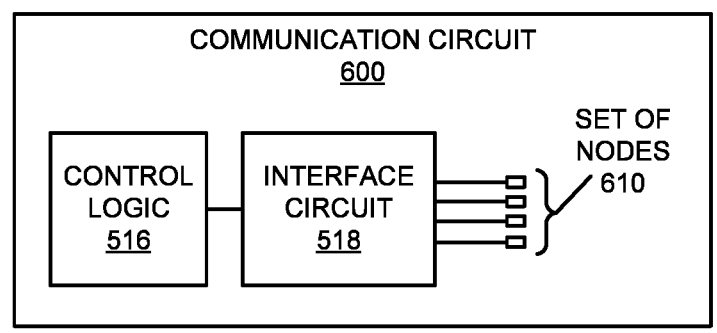
FIG. 6 is a block diagram illustrating a communication circuit for use in the one of the electronic devices in FIG. 1 in accordance with embodiments of the present disclosure.

An integrated circuit (which is sometimes referred to as a 'communication circuit') may implement some or all of the functionality of networking subsystem 514. This is illustrated in FIG. 6, which presents a block diagram of communication circuit 600 according to some embodiments. In particular, communication circuit 600 may include: control logic 516, an interface circuit 518 and set of nodes 610 that can couple to set of antennas 520 (FIG. 5). For example, set of nodes 610 may include at least one node (such as a pad).

Referring back to FIG. 5, the integrated circuit may include hardware and/or software mechanisms that are used for transmitting wireless signals from electronic device 500 and receiving signals at electronic device 500 from other electronic devices. For example, the integrated circuit may transmit probe-request frames that include addresses in the block of addresses (instead of the MAC address of electronic device 500). Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises a probe-reply frame, etc.)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518) or in firmware in interface circuit 518. Alternatively or additionally, at least some of the operations in the communication technique may be implemented in a physical layer, such as hardware in interface circuit 518.

Furthermore, while the use of addresses in the block of addresses in probe-request frames was used as an illustration, in other embodiments the addresses in the block of addresses may be used in a wide variety of frames and messages, including frames and messages that are communicated after authentication and/or association. Thus, in general, the addresses in the block of addresses may be used whenever the electronic device makes a service request.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   at least a node configured to couple to an antenna; and
   an interface circuit, coupled to the node, configured to communicate with an address-management server and another electronic device, wherein the interface circuit is configured to:
     request, at the node, a block of addresses from the address-management server that identifies the electronic device;
     receive, from the node, the block of addresses from the address-management server;
     transmit, to the node, probe requests to the other electronic device; and
     receive, from the node, probe replies from the other electronic device in response to the probe requests, wherein a given probe request includes a given address in the block of addresses that is different from addresses in the block of addresses included in a remainder of the probe requests; and
   wherein the addresses in the block of addresses are other than a media access control (MAC) address of the electronic device.

2. The electronic device of claim 1, wherein the addresses in the block of addresses include a first portion that identifies a manufacturer of the electronic device and a second portion that identifies the electronic device.

3. The electronic device of claim 2, wherein the second portion of the addresses includes one of: pseudorandom numbers, random numbers; a set of sequential numbers; and hexadecimal coding.

4. The electronic device of claim 1, wherein the other electronic device includes access points.

5. The electronic device of claim 1, wherein use of the addresses in the block of addresses inhibits passive location tracking of the electronic device.

6. The electronic device of claim 1, wherein, after the electronic device associates with the other electronic device, the interface circuit is configured to include the MAC address during communication with the other electronic device.

7. The electronic device of claim 1, wherein the interface circuit is configured to communicate with the address-management server and the other electronic device using a communication protocol that is compatible with an IEEE 802.11 standard.

8. The electronic device of claim 1, further comprising:
a processor; and
a memory, coupled to the processor, which stores a program module configured to be executed by the processor, wherein, when executed by the processor, the program module causes the electronic device to provide a command for the block of addresses, and wherein the interface circuit is configured to provide the request for the block of addresses in response to the command.

9. A non-transitory computer-readable storage medium for use in conjunction with an electronic device, the non-transitory computer-readable storage medium storing a program module to identify the electronic device using a block of addresses, wherein, when executed by the electronic device, the program module causes the electronic device to:
request, at least a node of the electronic device, the block of addresses from the address-management server that identifies the electronic device;
receive, from the node, the block of addresses from the address-management server;
transmit, to the node, probe requests to another electronic device; and
receive, from the node, probe replies from the other electronic device in response to the probe requests, wherein a given probe request includes a given address in the block of addresses that is different from addresses in the block of addresses included in a remainder of the probe requests; and
wherein the addresses in the block of addresses are other than a media access control (MAC) address of the electronic device.

10. The computer-readable storage medium of claim 9, wherein the addresses in the block of addresses include a first portion that identifies a manufacturer of the electronic device and a second portion that identifies the electronic device.

11. The computer-readable storage medium of claim 10, wherein the second portion of the addresses includes one of: pseudorandom numbers, random numbers; a set of sequential numbers; and hexadecimal coding.

12. The computer-readable storage medium of claim 9, wherein the other electronic device includes an access point.

13. The computer-readable storage medium of claim 9, wherein use of the addresses in the block of addresses inhibits passive location tracking of the electronic device.

14. The computer-readable storage medium of claim 9, wherein, after the electronic device associates with the other electronic device, the interface circuit is configured to include the MAC address during communication with the other electronic device.

15. The computer-readable storage medium of claim 9, wherein the interface circuit is configured to communicate with the address-management server and the other electronic device using a communication protocol that is compatible with an IEEE 802.11 standard.

16. A communication circuit, comprising:
at least a node configured to couple to an antenna; and
an interface circuit configured to:
request, at the node, a block of addresses from the address-management server that identifies the electronic device;
receive, from the node, the block of addresses from the address-management server;
transmit, to the node, probe requests to another electronic device; and
receive, from the node, probe replies from the other electronic device in response to the probe requests, wherein a given probe request includes a given address in the block of addresses that is different from addresses in the block of addresses included in a remainder of the probe requests; and
wherein the addresses in the block of addresses are other than a media access control (MAC) address of the electronic device.

17. The communication circuit of claim 16, wherein use of the addresses in the block of addresses inhibits passive location tracking of the electronic device.

18. The communication circuit of claim 16, wherein, after the communication circuit associates with the other electronic device, the interface circuit is configured to include the MAC address during communication with the other electronic device.

19. A method for identifying an electronic device using a block of addresses, wherein the method comprises:
by the electronic device:
requesting, at least a node of the electronic device, the block of addresses from the address-management server that identifies the electronic device;
receiving, from the node, the block of addresses from the address-management server;
transmitting, to the node, probe requests to another electronic device; and
receiving, from the node, probe replies from the other electronic device in response to the probe requests, wherein a given probe request includes a given address in the block of addresses that is different from addresses in the block of addresses included in a remainder of the probe requests; and
wherein the addresses in the block of addresses are other than a media access control (MAC) address of the electronic device.

20. The method of claim 19, wherein use of the addresses in the block of addresses inhibits passive location tracking of the electronic device.

* * * * *